United States Patent
Schmidt et al.

(10) Patent No.: US 11,059,389 B2
(45) Date of Patent: Jul. 13, 2021

(54) METHOD FOR OPERATING A VEHICLE SEAT WITH ELECTRIC SEAT ADJUSTMENT

(71) Applicant: Ford Global Technologies, LLC, Dearborn, MI (US)

(72) Inventors: Eike Schmidt, Cologne (DE); Stefan Wolter, Wurselen (DE); Philipp Wolf, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 230 days.

(21) Appl. No.: 16/275,585

(22) Filed: Feb. 14, 2019

(65) Prior Publication Data

US 2019/0275915 A1    Sep. 12, 2019

(30) Foreign Application Priority Data

Mar. 12, 2018  (DE) .................. 102018203658.6

(51) Int. Cl.
*B60N 2/02*  (2006.01)
*A47C 31/12*  (2006.01)

(52) U.S. Cl.
CPC .......... *B60N 2/0252* (2013.01); *A47C 31/126* (2013.01); *B60N 2/0248* (2013.01); *B60N 2002/0272* (2013.01)

(58) Field of Classification Search
CPC ...... B60N 2/00; B60N 2/0252; B60N 2/0248; B60N 2002/0272
See application file for complete search history.

(56) References Cited

U.S. PATENT DOCUMENTS

| 7,159,683 | B2 | 1/2007 | Reitter |
| 8,104,935 | B2 | 1/2012 | Kanning |
| 9,105,212 | B2 | 8/2015 | Lin |
| 9,771,003 | B2* | 9/2017 | Kolich ............... G01G 19/4142 |
| 9,808,084 | B2* | 11/2017 | Di Censo ............. A47C 31/126 |
| 9,994,125 | B2* | 6/2018 | Magana ................. B60K 35/00 |
| 2015/0366350 | A1 | 12/2015 | Di Censo et al. |

FOREIGN PATENT DOCUMENTS

CN      106470871 A     3/2017

* cited by examiner

*Primary Examiner* — Thomas G Black
*Assistant Examiner* — Tarek Elarabi
(74) *Attorney, Agent, or Firm* — David Coppiellie; Price Heneveld LLP

(57) ABSTRACT

A method for operating a vehicle seat of a motor vehicle with electric seat adjustment is provided. The method includes the steps of importing a measurement data set that is representative of an initial sitting position of a person sitting on the vehicle seat, evaluating the measurement data set in order to determine a target sitting position data set for a target sitting position, and evaluating at least the measurement data set and the target sitting position data set in order to determine a transfer data set for transferring the initial sitting position into the target sitting position at a rate of change below a perception threshold.

10 Claims, 5 Drawing Sheets

METHOD FOR OPERATING A VEHICLE SEAT WITH ELECTRIC SEAT ADJUSTMENT

FIELD OF THE INVENTION

The present invention generally relates to vehicle seating, and more particularly relates to a method for operating a vehicle seat with electric seat adjustment, a control device and a motor vehicle having a control device.

BACKGROUND OF THE INVENTION

Vehicle seats are commonly understood to be seats installed in vehicles, such as motor vehicles for the occupants of the motor vehicle. Depending upon the type of vehicle used and the differentiation between driver and passenger seats as well as the level of equipment, the vehicle seats installed in motor vehicles can differ significantly.

Modern motor vehicles have vehicle seats that offer a large and increasing number of seat adjustments in order to ensure comfortable, ergonomic and safe seating. With electric seat adjustment, a plurality of different sitting positions can possibly be stored electronically and activated to make a change in seat adjustments.

A method is known from U.S. Patent Application Publication No. 2015/0366350 A1 for operating a vehicle seat with electric seat adjustment, having the steps of importing sensor data that are representative of a sitting position, determining a posture model that is representative of the current posture, comparing the posture model to an optimal posture, and producing posture changes by displacing the seat. However, generally it is provided only that posture changes occur at a reduced speed in order to avoid startling or surprising a person sitting in a vehicle seat or making the person perceive the change in sitting position as unfamiliar or otherwise distracting. In that case, the person will notice the change in posture and may want to return to the sitting position he or she selected himself or herself.

SUMMARY OF THE INVENTION

According to one aspect of the present invention, a method for operating a vehicle seat of a motor vehicle with electric seat adjustment is provided. The method includes the steps of importing a measurement data set that is representative of an initial sitting position of a person sitting on the vehicle seat, evaluating the measurement data set in order to determine a target sitting position data set for a target sitting position, and evaluating at least the measurement data set and the target sitting position data set in order to determine a transfer data set for transferring the initial sitting position into the target sitting position at a rate of change below a perception threshold.

According to another aspect of the present invention, a control device for operating a vehicle seat of a motor vehicle with electric seat adjustment, wherein the control device is configured to import a measurement data set that is representative of an initial sitting position of a person sitting in the vehicle seat, to evaluate the measurement data set in order to determine a target sitting position data set for a target sitting position and to evaluate at least the measurement data set and the target sitting position data set in order to determine a transfer data set for transferring the initial sitting position into the target sitting position at a rate of change that is below a perception threshold.

According to yet a further aspect of the present invention, a motor vehicle is provided. The motor vehicle includes a vehicle seat, electric seat adjustment, and a control device for operating the vehicle seat with the electric seat adjustment, wherein the control device is configured to import a measurement data set that is representative of an initial sitting position of a person sitting in the vehicle seat, to evaluate the measurement data set in order to determine a target sitting position data set for a target sitting position and to evaluate at least the measurement data set and the target sitting position data set in order to determine a transfer data set for transferring the initial sitting position into the target sitting position at a rate of change that is below a perception threshold.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
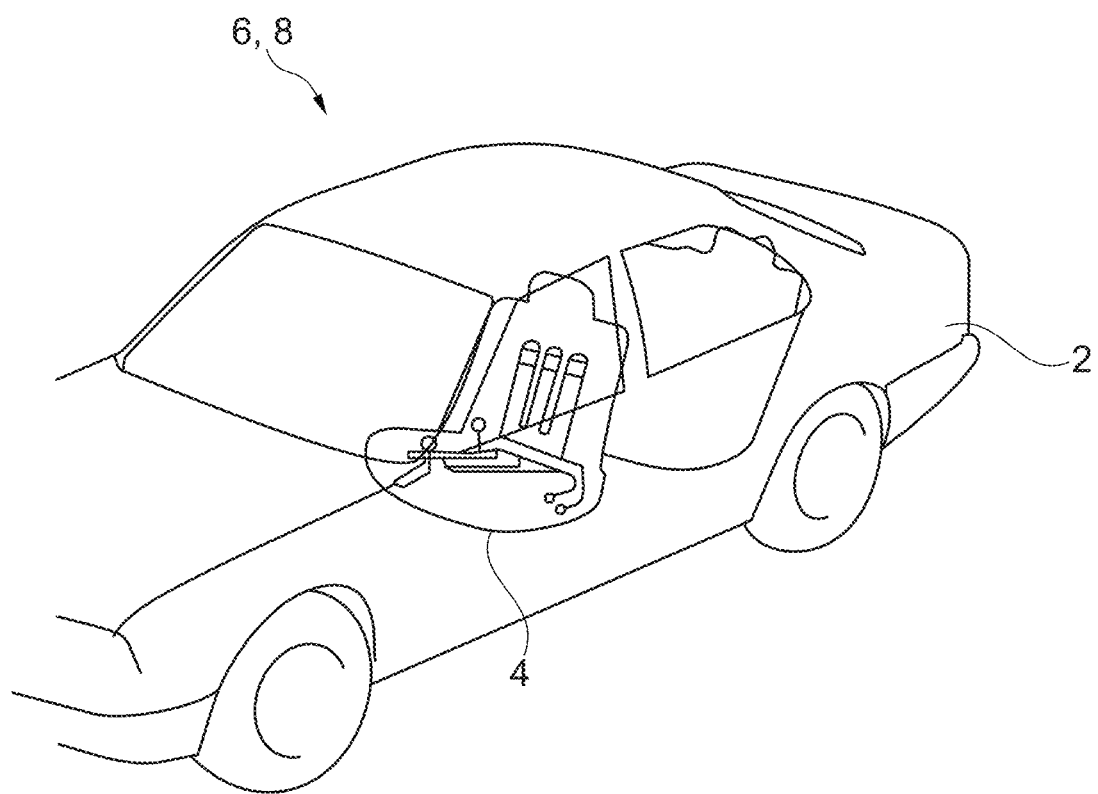
FIG. 1 is a schematic representation of a motor vehicle shown equipped with a vehicle seat with electric seat adjustment.

Reference is made initially to FIG. 1 which shows a motor vehicle 2 that is configured as a passenger car in the present exemplary embodiment. Deviating from the present exemplary embodiment, however, the motor vehicle 2 can also be a different vehicle designed for passenger transportation. Furthermore, the motor vehicle 2 can also be a truck, motorcycle, airplane, train, ship or an agricultural and/or construction vehicle. Deviating from the present exemplary embodiment, the vehicle can also be configured to be a self-driving vehicle.

It should be appreciated that a plurality of vehicle seats 4 for a driver and further passengers may be arranged in the passenger compartment of the motor vehicle 2. However, only the vehicle seat 4 for the driver is shown in FIG. 1 for illustration purposes. The vehicle and method for operating a vehicle seat may be used on any one or more of the seats.

In the present exemplary embodiment, the vehicle seat 4 has electric seat adjustment with a control device 6, with which multiple different sitting adjustments can be stored electronically and can be activated to make a change. Moreover, the vehicle seat 4 in the present exemplary embodiment is configured to detect the sitting position of the driver sitting in the vehicle seat 4. To this end, a sitting position detection device 8 is provided, which has sensors for detecting and retaining the sitting position of the person.

The sensors (e.g., fiber-optic sensors, force and pressure sensors) can be disposed in various positions, such as in a seating surface and/or back rest of the vehicle seat. 4. Alternatively, one or more camera systems that provide image data about the person sitting in the vehicle seat 4 can also be associated with the sitting position detection device 8. Alternatively, the position of the adjustment possibilities can be recorded by sensors on the servomotors, and the body posture of the driver can be estimated. A combination of the aforementioned methods for determining the sitting position is also possible.

Figure 2:
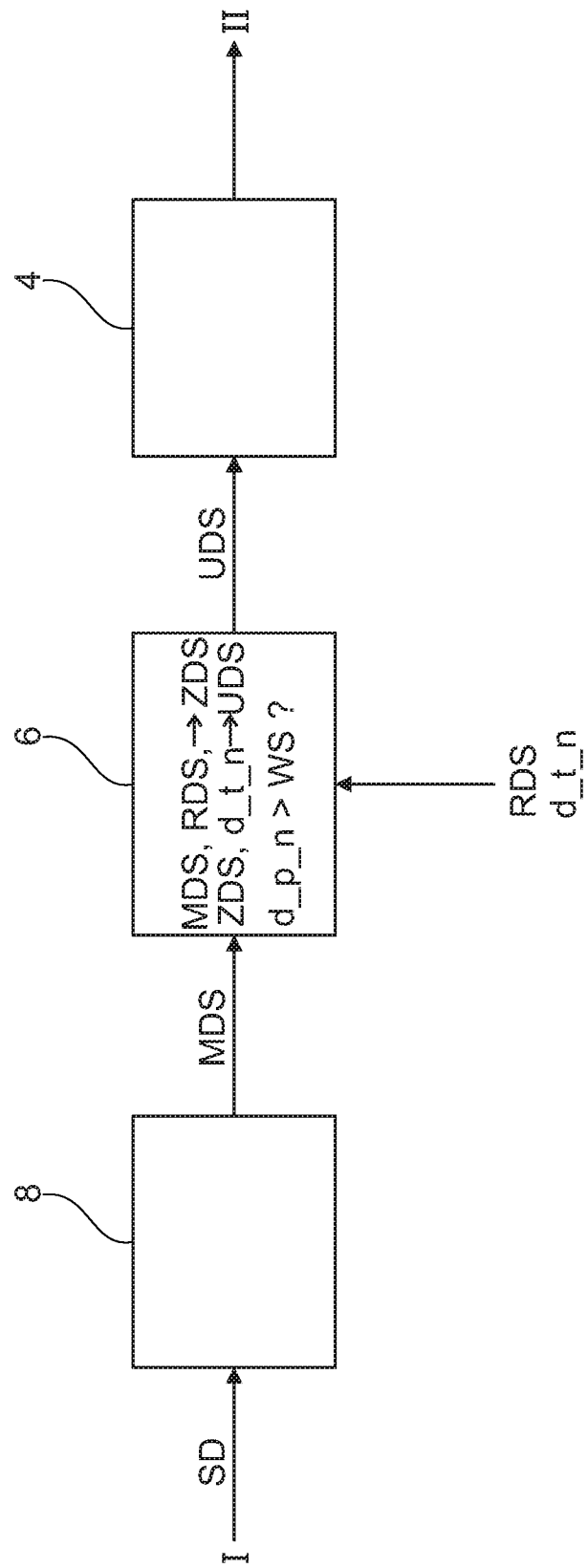
FIG. 2 is a schematic representation of components that are associated with the electric seat adjustment.

Reference is now additionally made to FIG. 2. The sitting position detection device 8 is configured to evaluate the sensor data SD to determine, for example, the size of the seated person and/or angular values between selected joints of the person, such as the arm and/or knee joints. As a starting point, the sitting position detection device 8 provides a measurement data set MDS, the data of which is representative of a sitting position of a person who is sitting in a vehicle seat 4.

However, sitting positions generally are often selected by the seated person that may be comfortable but that do not represent the optimum with regard to passive safety in the event of an accident, the safe steering of the vehicle and ergonomics and/or other factors.

To counteract this, the control device 6 is configured to evaluate the measurement data set (MDS) that is representative of an initial sitting position I in order to determine a target sitting position data set (ZDS) for a target sitting position II. Furthermore, the control device 6 is configured to evaluate the measurement data set MDS and the target sitting position data set ZDS in order to determine a transfer data set UDS for transferring the initial sitting position I into the target sitting position II at a rate of change $d\_p\_n$ that is below a perception threshold WS.

The initial sitting position I can be understood to be an actual state, while the target sitting position II can be understood to be a nominal state that represents an optimum with regard to passive safety in the event of an accident and/or the safe steering of the vehicle and/or ergonomics and/or other factors.

The threshold of perception WS indicates the rate of change $d\_p\_n$ of the sitting position after which a person perceives a movement/modification of the position and/or angular values. The transfer data set UDS is then used to activate individual servomotors of the vehicle seat 4.

Furthermore, the control device 6 in the present exemplary embodiment is configured to also evaluate a reference data set RDS when evaluating the measurement data set MDS. The reference data set RDS contains data for optimal sitting positions with regard to passive safety in the event of an accident and/or safe steering of the vehicle and/or ergonomics and/or other factors.

Moreover, the control device 6 in the present exemplary embodiment is configured to take into account a value indicative of a journey time $d\_t\_n$ when determining the transfer data set UDS. The journey time $d\_t\_n$ can be determined, for example, by evaluating data from a navigation device, into which a destination has been entered by the driver before a journey. Additionally or alternatively, the journey time $d\_t\_n$ can also be estimated; for example, if a journey always begins at the same time of day, the destination can be determined to be a workplace to which the driver regularly travels.

The control device 6 can also be configured to activate components apart from the vehicle seat 4, such as the steering wheel, arm rests, foot rests, lower leg supports, pedals, tables, device or drink holders, mirrors, air nozzles or sun visors, in order to adapt their positions in accordance with the position of the vehicle seat 4.

Figure 3:
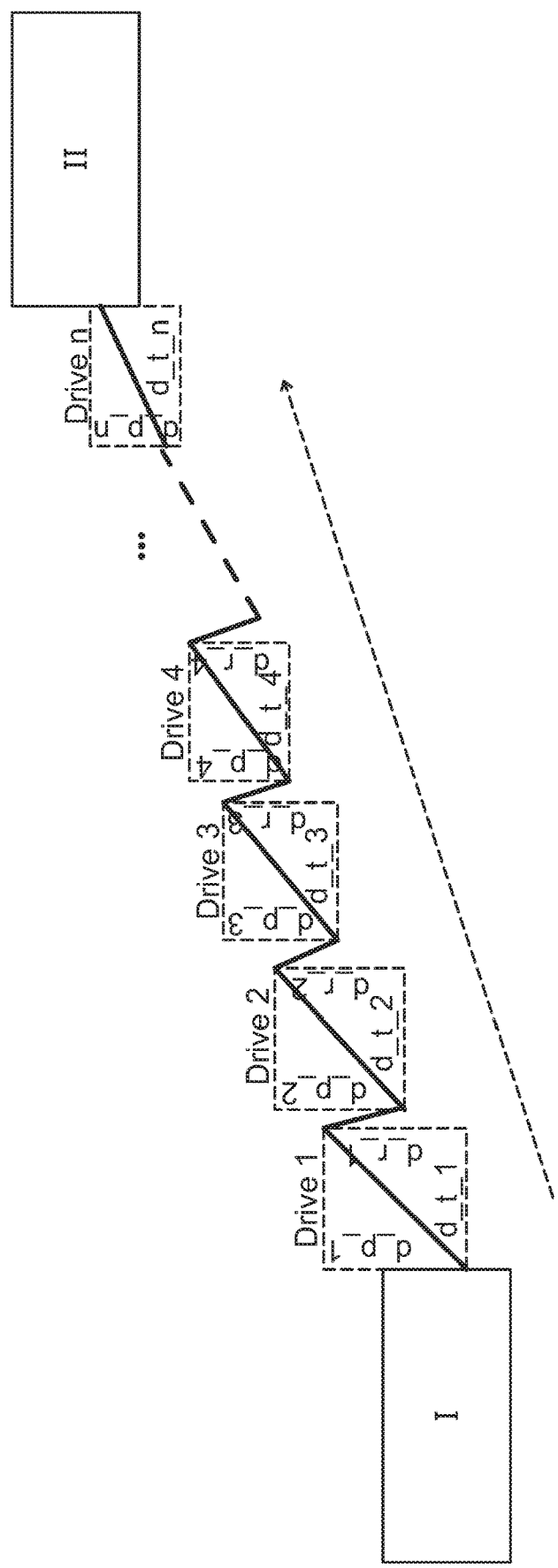
FIG. 3 is a schematic representation of a process sequence of a method for operating the vehicle seat shown in FIG. 1.
Figure 4:
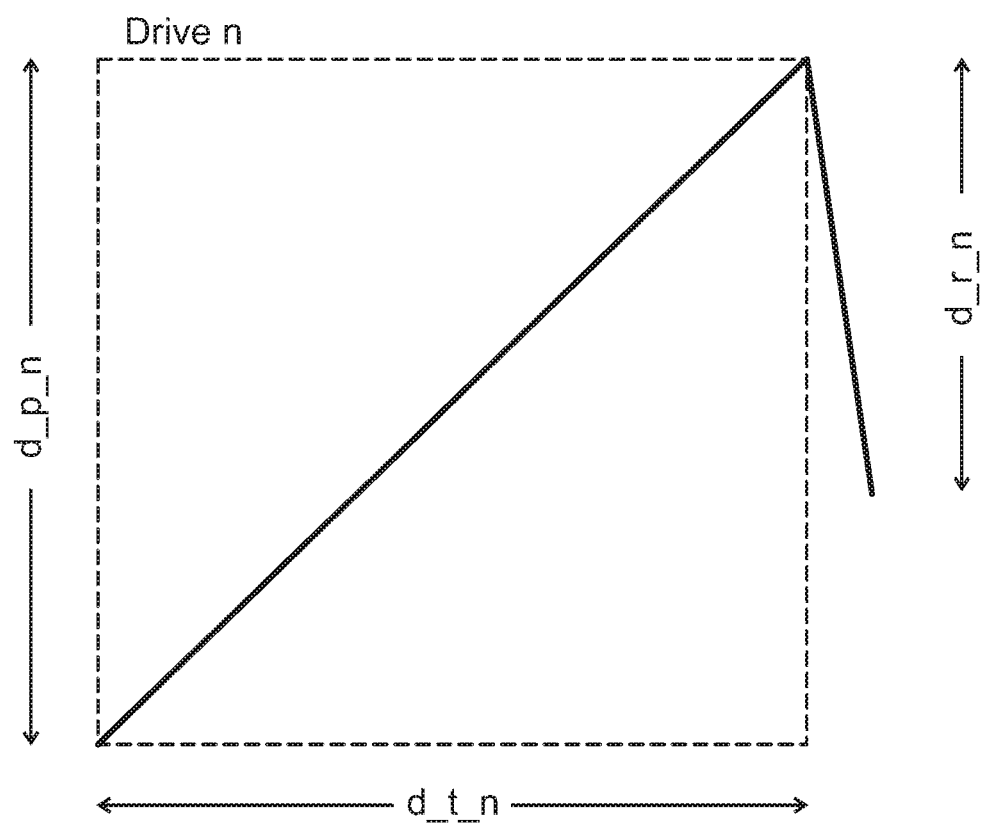
FIG. 4 is a schematic representation of further details of the method for operating the vehicle seat shown in FIG. 3.

The function of the method of operating the vehicle seat will now be explained with additional reference to FIGS. 3 and 4. A person sits down in the vehicle seat 4 and selects a sitting position, which is the initial sitting position I. The sitting position detection device 8 evaluates the sensor data in order to determine, for example, the size of the person and/or angular values between selected joints of the person, such as the arm and/or knee joints. The sitting position detection device 8 then makes the measurement data set MDS available to the control device 6.

The control device 6 subsequently imports the reference data set RDS and determines the target sitting position data set ZDS. In a further step, the control device 6 inputs the journey time $d\_t\_n$ and then determines the transfer data set UDS. The transfer data set UDS contains values that are representative of the rates of change $d\_p\_n$ of the respective angles and/or positions. Thus, the respective rates of change $d\_p\_n$ can be determined, for example, by use of the element-by-element division of the difference diff between the initial sitting position I and the target sitting position II by the journey time $d\_t\_n$:

$$d\_p\_n = \text{diff}/d\_t\_n$$

In this way, as is explained in even greater detail below, the respective rates of change $d\_p\_n$ are determined such that they lie below the respective thresholds of perception WS.

In the scenario shown in FIG. 3, the respective journey time $d\_t\_n$ is too brief to reach the target sitting position II at rates of change $d\_p\_n$ below the respective thresholds of perception WS. Instead, a plurality of journeys (drive 1 to drive n) are necessary to accomplish this.

It should be recognized that the transfer data set UDS is combined with an attenuation factor d, e.g., by multiplying the rates of change $d\_p\_n$ by an attenuation factor d, which can assume values greater than zero but less than one. It should also be recognized that the attenuation factor d is increased at the start of each journey (drive 1 to drive n); i.e., the following applies:

$$d(\text{drive } 1) < d(\text{drive } 2) < d(\text{drive } 3) \ldots < d(\text{drive } n).$$

Between two journeys (drive 1 to drive n), a return movement is carried out at a respective return rate $d\_r\_n$ in order to counteract potential memory effects.

At the start of each further journey (drive 1 to drive n), the respective return rate $d\_r\_n$ is increased; i.e., the following applies: $r\_1$ (drive 1) $< d\_r\_2$(drive 2) $< d\_r\_3$ (drive 3) ... $< d\_r\_4$ (drive n).

Figure 5:
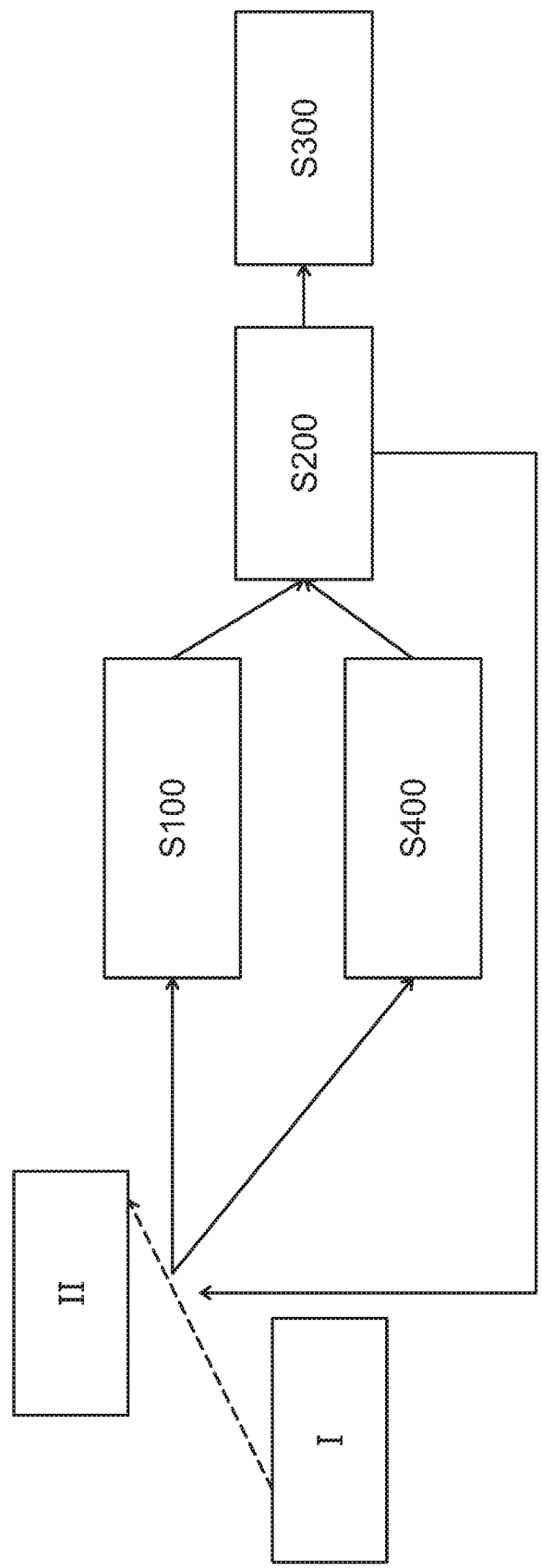
FIG. 5 is a schematic representation of further details of the method for operating the vehicle seat shown in FIG. 3.

Reference is now additionally made to FIG. 5. A scenario is assumed in which at least one of the rates of change $d\_p\_n$ lay above the respective threshold of perception WS. This would lead to a repositioning of the vehicle seat 4 by the seated person in a step S100. In so doing, the respective directions of movement are oriented away from the target sitting position II.

In a further step S200, the respective rates of change $d\_p\_n$ are reduced, for example, by a predetermined value or by multiplication by a predetermined value with values less than one and greater than zero.

If the vehicle seat 4 is again repositioned by the person, the respective rates of change $d\_p\_n$ can be reduced once more. This can result in the respective rates of change $d\_p\_n$ being reduced to values of zero. In this case, the adaptation of the sitting position would end in a further step S300, and the current sitting position would replace the target sitting position II.

Furthermore, in a further step S400, a comfort evaluation can be carried out, such as by personal entries according to one embodiment. This can occur at intervals of a predetermined duration. In this way, it is possible to modify the sitting position, imperceptibly to a person sitting in the vehicle seat, so as to bring it into the optimal sitting position with regard to passive safety in the event of an accident, safe steering of the vehicle and ergonomics and/or other factors.

The present disclosure provides a method for operating a vehicle seat of a motor vehicle with electric seat adjustment, having the steps of importing a measurement data set that is representative of an initial sitting position of a person sitting in a vehicle seat, evaluating the measurement data set in order to determine a target sitting position data set for a target sitting position, and evaluating at least the measurement data set and the target sitting position data set in order to determine a transfer data set for transferring the initial sitting position into the target sitting position at a rate of change below a perception threshold.

In other words, an actual state of the sitting position is identified with the measurement data set, and a target sitting position data set is identified for a nominal state on the basis of the measurement data set. Here, the sitting position is understood to mean the seated body posture, which arises from the interaction of muscles, ligaments and bones of a person sitting in the vehicle seat. The transfer data set, with which the vehicle seat is moved from its initial sitting position into a target sitting position, is then determined by evaluating the measurement data set and the target position data set, wherein the changes required to do so are carried out so slowly that the person sitting in the vehicle seat cannot perceive them because they lie below his or her threshold of perception. In this way, it is possible to modify the sitting position, imperceptibly to a person sitting in the vehicle seat, so as to bring the seat into the optimal sitting position with regard to passive safety in the event of an accident, safe steering of the vehicle and ergonomics and/or other factors.

According to one embodiment, a reference data set is also evaluated when the target sitting position data set is determined. The reference data set contains data for optimal sitting positions with regard to passive safety in the event of an accident and/or safe steering of the vehicle and/or ergonomics and/or other factors. The reference data set can be obtained, for instance, with the aid of a human model, such as a manikin or RAMSIS, into which the body size of the person included in the measurement data set may be entered. Moreover, characteristic proportions and/or corpulence variations can also be taken into account (e.g., entered by the driver or measured by integrated sensors). The target sitting position can thus be individualized.

According to a further embodiment, a value that is indicative of a journey time is considered when determining the transfer data set. The journey time can be determined, for example, by evaluating data from a navigation device, into which a destination has been entered by the driver before a journey. Additionally or alternatively, the journey time can also be estimated; for example, if a journey always begins at the same time of day, the destination can be determined to be a workplace. It can thereby be ensured that the changes that result in achieving the target sitting position lie below the perception threshold. Furthermore, it is also possible that, during short journeys, the sitting position approaches the target sitting position without reaching the target sitting position. In other words, achieving the target sitting position will then extend over multiple journeys.

According to one, the transfer data set is combined with an attenuation factor. The attenuation factor can assume values greater than zero but smaller than one. The respective rates of change are then multiplied by the attenuation factor. An adaptation to the respective rates of change can thus take place. Moreover, the attenuation factor can also be a scale with a plurality of attenuation factor values for each respective rate of change.

According to another embodiment, the attenuation factor is increased each time it is combined with the transfer data set. In this way, slow modifications to the person's sitting position can be taken into consideration.

According to a further embodiment, a return movement is made at a return rate between two journeys. The return movement can be part of the transfer data set or it can be a separate data set. In this way, the person's memory effects can be taken into consideration.

The present disclosure further relates to a computer program, a control device and a motor vehicle having a control device of this type for carrying out the method for operating a vehicle seat.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for operating a vehicle seat of a motor vehicle with electric seat adjustment comprising the steps of:
    importing with a control device a measurement data set that is representative of an initial sitting position of a person sitting on the vehicle seat;
    evaluating with the control device the measurement data set in order to determine a target sitting position data set for a target sitting position;
    evaluating with the control device at least the measurement data set and the target sitting position data set in order to determine a transfer data set for transferring the initial sitting position into the target sitting position at a rate of change below a perception threshold, wherein the perception threshold is a threshold rate of change at or below which a person seated in the vehicle seat cannot perceive the rate of change, and wherein a value indicative of a journey time is taken into account when determining the transfer data set; and
    operating the vehicle seat with the electric seat adjustment, wherein the transfer data set is combined with an attenuation factor having a value greater than zero and smaller than one, wherein the rate of change is multiplied by the attenuation factor, and wherein the attenuation factor is increased each time the attenuation factor is combined with the transfer data set.

2. The method as claimed in claim 1, further comprising the step of evaluating a reference data set when the target sitting position data set is evaluated.

3. The method as claimed in claim 1, wherein a return movement is carried out at a return rate between two journeys.

4. The method as claimed in claim 1, wherein the method is carried out with a computer program product.

5. A control device for operating a vehicle seat of a motor vehicle with electric seat adjustment, wherein the control device is configured to import a measurement data set that is representative of an initial sitting position of a person sitting in the vehicle seat, the control device is configured to evaluate the measurement data set in order to determine a target sitting position data set for a target sitting position and the control device is configured to evaluate at least the measurement data set and the target sitting position data set in order to determine a transfer data set for transferring the initial sitting position into the target sitting position at a rate of change that is below a perception threshold, wherein the perception threshold is a threshold rate of change at or below which a person seated in the vehicle seat cannot perceive the rate of change, wherein the control device is configured to take into account a value indicative of a journey time when determining the transfer data set, and wherein the control device operates the vehicle seat with the electric seat adjustment, wherein the control device is configured to combine the transfer data set with an attenuation factor having a value grater than zero and smaller than one, wherein the rate of change is multiplied by the attenuation factor, and wherein the control device is configured to increase the attenuation factor each time the attenuation factor is combined with the transfer data set.

6. The control device as claimed in claim 5, wherein the control device is configured to also evaluate a reference data set when evaluating the target sitting position data set.

7. The control device as claimed in claim 5, wherein the control device is configured to carry out a return movement at a return rate between two journeys.

8. A motor vehicle comprising:
a vehicle seat;
electric seat adjustment; and
a control device for operating the vehicle seat with the electric seat adjustment, wherein the control device is configured to import a measurement data set that is representative of an initial sitting position of a person sitting in the vehicle seat, to evaluate the measurement data set in order to determine a target sitting position data set for a target sitting position and to evaluate at least the measurement data set and the target sitting position data set in order to determine a transfer data set for transferring the initial sitting position into the target sitting position at a rate of change that is below a perception threshold, wherein the perception threshold is a threshold rate of change at or below which a person seated in the vehicle seat cannot perceive the rate of change, and wherein the control device is configured to take into account a value indicative of a journey time when determining the transfer data set, wherein the control device is configured to combine the transfer data set with an attenuation factor having a value greater than zero and smaller than one, wherein the rate of change is multiplied by the attenuation factor, and wherein the control device is configured to increase the attenuation factor each time the attenuation factor is combined with the transfer data set.

9. The motor vehicle as claimed in claim 8, wherein the control device is configured to also evaluate a reference data set when evaluating the target sitting position data set.

10. The motor vehicle as claimed in claim 8, wherein the control device is configured to carry out a return movement at a return rate between two journeys.

* * * * *